(12) United States Patent
Wu

(10) Patent No.: US 9,198,207 B2
(45) Date of Patent: Nov. 24, 2015

(54) METHOD OF HANDLING SMALL DATA TRANSMISSION IN WIRELESS COMMUNICATION SYSTEM

(71) Applicant: HTC Corporation, Taoyuan County (TW)

(72) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 14/318,687

(22) Filed: Jun. 29, 2014

(65) Prior Publication Data
US 2015/0004988 A1    Jan. 1, 2015

Related U.S. Application Data

(60) Provisional application No. 61/841,428, filed on Jul. 1, 2013.

(51) Int. Cl.
  *H04W 72/04* (2009.01)
  *H04W 76/02* (2009.01)
  *H04W 4/00* (2009.01)
  *H04W 4/20* (2009.01)

(52) U.S. Cl.
  CPC .............. *H04W 76/02* (2013.01); *H04W 4/005* (2013.01); *H04W 4/20* (2013.01)

(58) Field of Classification Search
  CPC ....... H04W 72/04; H04W 36/32; H04W 8/02; H04W 76/025; H04W 56/0005; H04W 74/0833; H04W 28/0221
  USPC .......... 455/450, 436, 437; 370/329, 328, 311, 370/230.1
  See application file for complete search history.

(56) References Cited

U.S. PATENT DOCUMENTS

2008/0305797 A1* 12/2008 Somasundaram et al. .... 455/436
2015/0087313 A1*  3/2015 Kim et al. ..................... 455/437

OTHER PUBLICATIONS

3GPP TR 23.887 V1.0.0 (Jun. 2013), "3rd Generation Partnership Project; Technical Specification Group Services and System Aspects; Machine-Type and other Mobile Data Applications Communications Enhancements (Release 12)", pp. 1-133.
3GPP TR 37.869 V0.3.0 (May 2013), "3rd Generation Partnership Project; Technical Specification Group Radio Access Network; Study on Enhancements to Machine-Type Communications (MTC) and other Mobile Data Applications; Radio Access Network (RAN) aspects (Release 12)", pp. 1-25.

* cited by examiner

*Primary Examiner* — Phuoc H Doan
(74) *Attorney, Agent, or Firm* — Winston Hsu; Scott Margo

(57) ABSTRACT

A method of handling a small data transmission for a network of a wireless communication system includes allowing a user equipment of the wireless communication system to establish a first radio resource control (RRC) connection for the small data transmission; receiving a first RRC connection setup complete message corresponding to the first RRC connection from the user equipment, wherein the first RRC connection setup complete message comprises small data information; and transmitting an RRC connection release message to the user equipment to release the first RRC connection when determining that the small data information is invalid.

17 Claims, 8 Drawing Sheets

| Direction | Messages |
|---|---|
| UL | RRC connection request |
| DL | RRC connection setup |
| UL | RRC connection setup complete (Connection ID, Token) |
| UL | Small data |
| DL | Small data |
| DL | RRC connection release |

FIG. 3

| Direction | Messages |
|---|---|
| UL | RRC connection request |
| DL | RRC connection setup |
| UL | RRC connection setup complete (KSI, EPS bearer identity, IP packet) |
| DL | RRC connection release (Response of IP packet) |

FIG. 6

METHOD OF HANDLING SMALL DATA TRANSMISSION IN WIRELESS COMMUNICATION SYSTEM

CROSS REFERENCE TO RELATED APPLICATIONS

This application claims the benefit of U.S. Provisional Application No. 61/841,428, filed on Jul. 1, 2013 and entitled "Method and Apparatus for small data transmission in a wireless communication system", the contents of which are incorporated herein by reference.

BACKGROUND OF THE INVENTION

1. Field of the Invention

The present invention relates to a method utilized in a wireless communication system, and more particularly, to a method of handling small data transmission in a wireless communication system.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, uplink multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Machine-type communication (MTC) is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication. In comparison with a current mobile network communication service, the MTC can be characterized as a different market scenario, data communication, less costs and efforts, a potentially great number of MSs for communication, wide service areas, low traffic per MS, etc.

Most MTC devices and several UEs mainly transmit small data (e.g. an IP packet) for specific applications. Such transmission of small data may be regular but infrequent. For the purpose of power saving, the MTC devices and the UEs may enter an idle mode when there is no data required to be transmitted. If the small data needs to be transmitted, the MTC devices or the UEs may exchange a great number of control messages with the network for establishing a radio resource control (RRC) connection, in order to assign data radio bearer (DRB) for transmitting these small data. After the small data transmission is complete, the MTC devices or the UEs may release the RRC connection and the DRB, and return to the idle mode. In such a condition, the wireless communication system may perform a large number of control plane transmissions for only a small number of user plane messages, which causes a waste of radio resources.

In order to solve the abovementioned problem, the 3GPP TS 23.887 has defined several solutions for small data transmission. Such solutions include optimized RRC connection managements (Solutions 1a and 1b), control plane solutions (Solutions 2a and 2b), connectionless approaches (Solutions 3a and 3b), S1/Iu-only optimizations (Solutions 4a and 4b) and keeping the UEs in the connected mode (Solution 5a). However, these solutions may not be feasible in certain conditions. For example, if an eNB without Solution 2a capability receives the RRC connection establishment messages according to Solution 2a, the eNB may get stuck due to reception of an unexpected message. If the small data information contained in the complete message of the RRC connection according to the Solution 3b is invalid, the eNB may need to reject the RRC connection by sending an RRC connection reject message to the UE or the MTC device, but the UE or the MTC device may not receive this RRC connection reject message after the RRC connection is set up. Thus, there is a need for improvement over the prior art.

SUMMARY OF THE INVENTION

It is therefore an objective of the present invention to provide a method of handling a small data transmission for a wireless communication system to solve the abovementioned problem.

An embodiment of the present invention discloses a method of handling a small data transmission for a network of a wireless communication system. The method comprises allowing a user equipment of the wireless communication system to establish a first radio resource control (RRC) connection for the small data transmission; receiving a first RRC connection setup complete message corresponding to the first RRC connection from the user equipment, wherein the first RRC connection setup complete message comprises small data information; and transmitting an RRC connection release message to the user equipment to release the first RRC connection when determining that the small data information is invalid.

An embodiment of the present invention further discloses a method of handling a small data transmission for a user equipment of a wireless communication system. The method comprises establishing a first RRC connection for the small data transmission; transmitting a first RRC connection setup complete message corresponding to the first RRC connection to a network of the wireless communication system, wherein the first RRC connection setup complete message comprises small data information; and receiving an RRC connection release message from the network to release the first RRC connection when the network determines that the small data information is invalid.

An embodiment of the present invention further discloses a method of handling a small data transmission for a network of a wireless communication system. The method comprises allowing a user equipment of the wireless communication system to establish a first RRC connection for the small data transmission; applying an information element to an RRC connection setup message corresponding to the first RRC connection to indicate whether the network supports the small data transmission and transmitting the RRC connection setup message to the user equipment; receiving a first RRC connection setup complete message corresponding to the first RRC connection from the user equipment wherein the first RRC connection setup complete message comprises small data information when the user equipment determines that the network supports the small data transmission according to the information element; and receiving a second RRC connection setup complete message corresponding to the first RRC connection from the user equipment wherein the second RRC connection setup complete message does not comprise the small data information when the user equipment determines that the network does not support the small data transmission according to the information element.

An embodiment of the present invention further discloses a method of handling a small data transmission for a user equipment of a wireless communication system. The method comprises establishing a first RRC connection for the small data transmission; receiving an RRC connection setup message corresponding to the first RRC connection from a network of the wireless communication system, wherein an information element is applied to the RRC connection setup message to indicate whether the network supports the small data transmission; transmitting a first RRC connection setup complete message corresponding to the first RRC connection to the network wherein the first RRC connection setup complete message comprises small data information when determining that the network supports the small data transmission according to the information element; and transmitting a second RRC connection setup complete message corresponding to the first RRC connection to the network wherein the second RRC connection setup complete message does not comprise the small data information when determining that the network does not support the small data transmission according to the information element.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates a table of message transmission between the UE and the eNB for the RRC connection according to Solution 3b.

FIG. 6 illustrates a table of message transmission between the UE and the eNB for the RRC connection according to Solution 2a.

DETAILED DESCRIPTION

Figure 1:
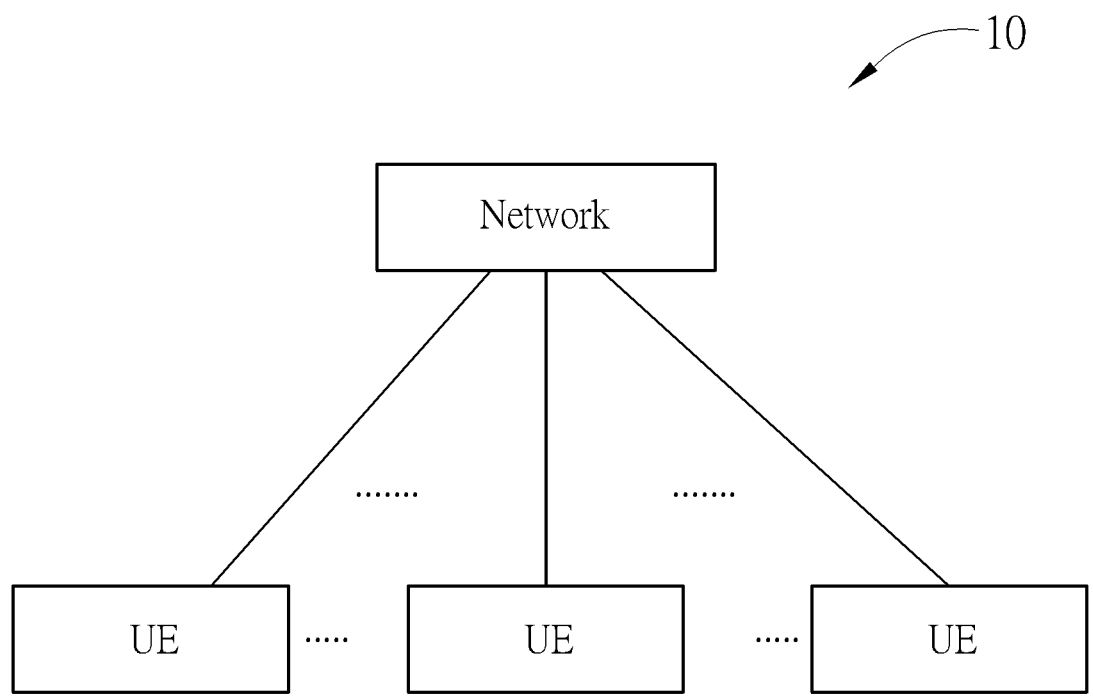
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 is briefly composed of a network and a plurality of user equipments (UEs). In FIG. 1, the network and the UEs are simply utilized for illustrating the structure of the wireless communication system 10. Practically, the network may be a public land mobile network (PLMN), such as a GERAN (GSM/EDEG radio access network) of a 2G/2.5G GSM system, a UTRAN (UMTS radio access network) of a 3G UMTS system, or a EUTRAN (evolved-UTAN) of the LTE system, comprising a plurality of base stations (i.e. BTSs, Node-Bs, or eNBs), network controllers (i.e. Base Station Controllers or Radio Network Controllers) and so on according to actual demands.

Each of the UEs may be a mobile station, a low cost device (e.g., machine type communication (MTC) device), a mobile phone, a laptop, a tablet computer, an electronic book or a portable computer system. In addition, the network and the UE may be seen as a transmitter or a receiver according to direction (i.e. transmission direction), e.g., for an uplink (UL), the UE is the transmitter and the network is the receiver, and for a downlink (DL), the network is the transmitter and the UE is the receiver. More specifically, for the network, the direction of the transmission is DL, and the direction of the reception is UL. For the UE, the direction of the transmission is UL, and the direction of the reception is DL.

Figure 2:
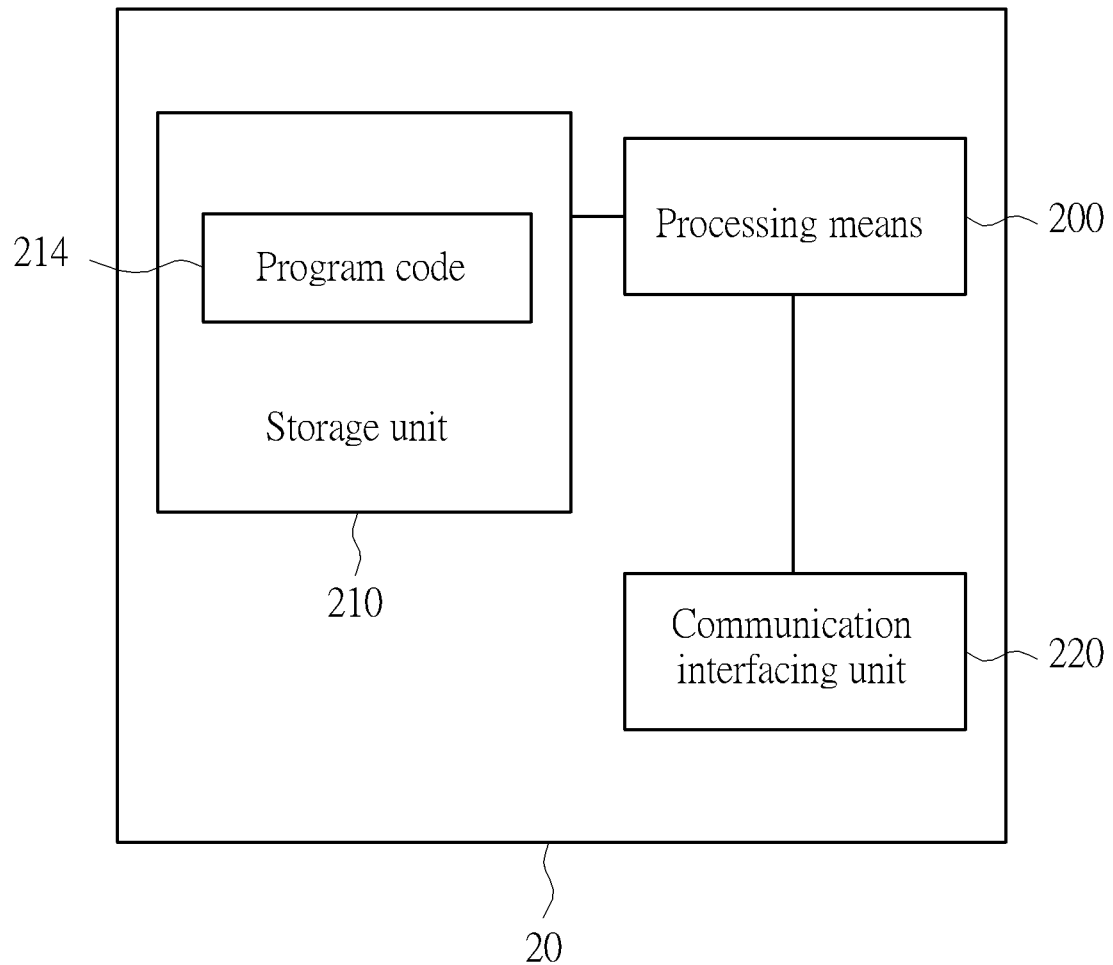
FIG. 2 is a schematic diagram of a communication device according to an embodiment of the present invention.

Please refer to FIG. 2, which is a schematic diagram of a communication device 20 according to an embodiment of the present invention. The communication device 20 may be used for realizing the network or the UEs shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

The UE may need to transmit small data to the network and thus establish a radio resource control (RRC) connection with an eNB according to the connectionless data transmission procedure provided by the 3GPP, such as the abovementioned Solution 3b. Please refer to FIG. 3, which illustrates a table of message transmission between the UE and the eNB for the RRC connection according to Solution 3b. As shown in FIG. 3, the UL indicates the transmissions from the UE to the eNB, and the DL indicates the transmissions from the eNB to the UE. The UE first transmits an RRC connection request message to the eNB, where the RRC connection request message may include a small data indicator indicating the required RRC connection is utilized for transmitting small data. The eNB then transmits an RRC connection setup message to set up the RRC connection. The UE then transmits an RRC connection setup complete message to the eNB, in order to indicate that the RRC connection setup is complete. According to Solution 3b, the RRC connection setup complete message may include a connection identifier (ID) and a token as small data information. The token may be a signal provided by the eNB as a reference to the UE context in the eNB when the UE first visits to a cell in the eNB. After reception of the RRC connection setup complete message, the small data transmission may be started if the eNB determines that both the connection ID and the token are valid. After the small data transmission is complete, the eNB may transmit an RRC connection release message to release the RRC connection.

According to the 3GPP specification, if the UE transmits a non-existent or invalid token or connection ID during the above process, the eNB may reject the RRC connection establishment and request the UE to go ahead with a service request procedure as if it first visited to the eNB. In such a condition, the eNB will issue a security mode command to the UE and generate a new token, or reject the UE depending on the outcome of the interaction with the mobility management entity (MME). However, the token and the connection ID are included in the RRC connection setup complete message, and the RRC connection may be established before the transmission of the RRC connection setup complete message. If the eNB transmits an RRC connection reject message to reject this connection, the RRC connection reject message may not be received by the UE. More specifically, after the RRC connection is established, the UE is in the connected mode and communicates with the eNB via a dedicated control channel (DCCH). The RRC connection reject message is sent via a common control channel (CCCH), and thus cannot be received by the UE. Therefore, the RRC connection cannot be rejected successfully.

Figure 4:
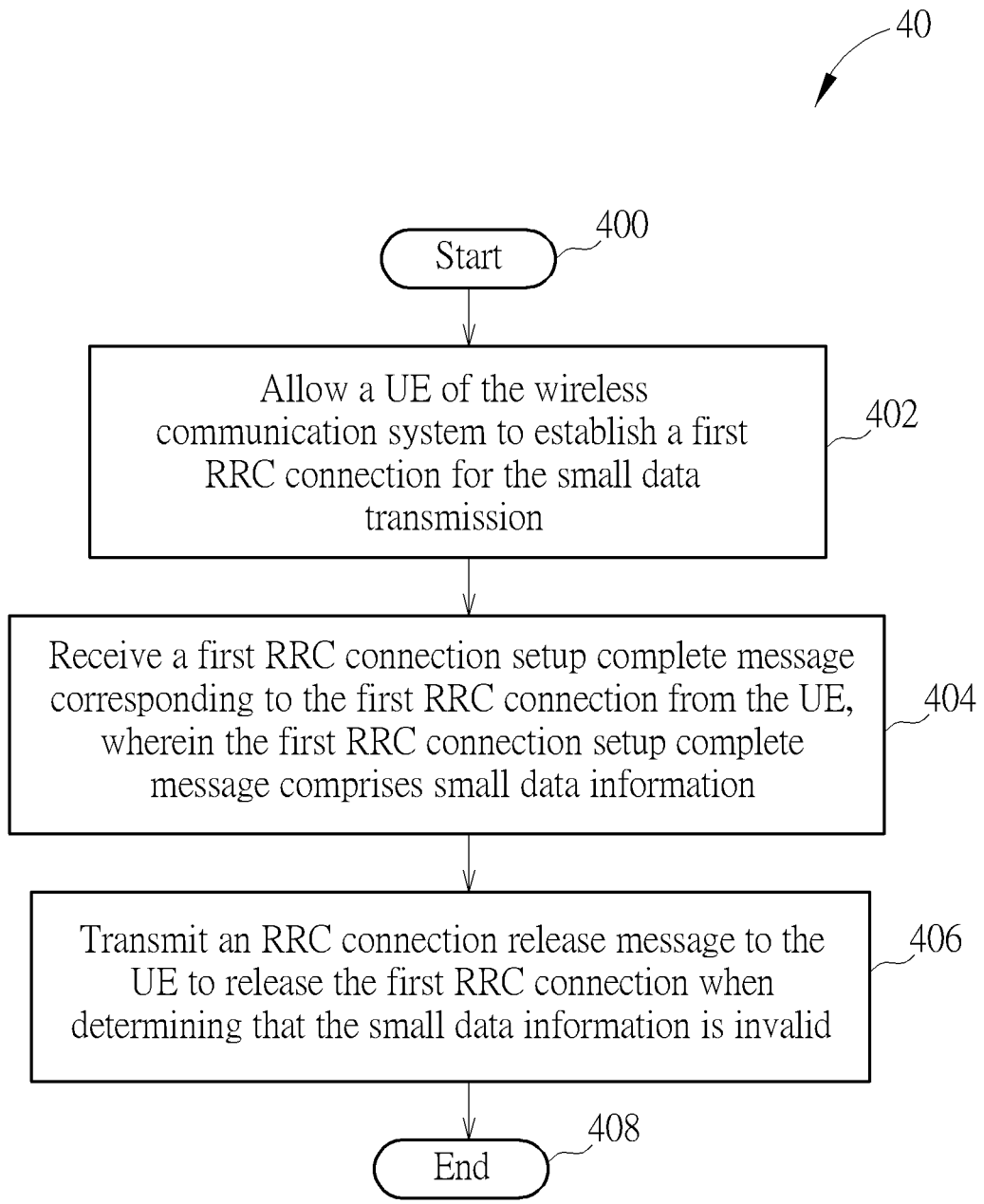
FIG. 4 is a flowchart of a process according to an embodiment of the present invention.

Please refer to FIG. 4, which is a flowchart of a process 40 according to an embodiment of the present invention. The process 40 may be utilized in an eNB of the network of the wireless communication system 10 shown in FIG. 1, for handling a small data transmission. The process 40 may be compiled into the program code 214 and includes the following steps:

Step 400: Start.

Step 402: Allow a UE of the wireless communication system to establish a first RRC connection for the small data transmission.

Step 404: Receive a first RRC connection setup complete message corresponding to the first RRC connection from the UE, wherein the first RRC connection setup complete message comprises small data information.

Step 406: Transmit an RRC connection release message to the UE to release the first RRC connection when determining that the small data information is invalid.

Step 408: End.

According to the process 40, the eNB first allows the UE to establish the first RRC connection for the small data transmission, and receives the first RRC connection setup complete message corresponding to the first RRC connection from the UE, wherein the first RRC connection setup complete message comprises small data information. Rather than rejecting the first RRC connection by transmitting the RRC connection reject message as in the prior art, according to the process 40, the eNB transmits the RRC connection release message to the UE to release the first RRC connection when determining that the small data information is invalid.

Since the first RRC connection is established before the transmission of the RRC connection setup complete message, the eNB transmits the RRC connection release message to release this RRC connection instead of transmitting a RRC connection reject message when determining that the small data information is invalid. The small data information may include at least one of a connection ID and a token, as those transmitted according to Solution 3b. The small data information may also be any other information related to small data transmission that may be included in the RRC connection setup complete message. For examples, according to Solution 2a of the 3GPP, the RRC connection setup complete message may include at least one of a key set identifier (KSI) and an evolved packet system (EPS) bearer identity as small data information. According to Solution 3a of the 3GPP, the RRC connection setup complete message may include a serving gateway (SGW) bearer resource identity as small data information. In an embodiment, the RRC connection release message may further include a cause indicating that the small data information is invalid, e.g. the connection ID is invalid or the token is invalid. The eNB may utilize the cause in the RRC connection release message to notify the UE that the connection ID or the token is invalid. The eNB may determine the connection ID or the token to be invalid if the eNB is overloaded and thereby cannot be connected with additional UEs.

After the RRC connection release message is received by the UE, the first RRC connection may be released. At this moment, the eNB further allows the UE to establish a second RRC connection for the small data transmission. During the establishment procedure of the second RRC connection, the eNB may receive a second RRC connection setup complete message corresponding to the second RRC connection from the UE, wherein the second RRC connection setup complete message may comprise a service request message. The service request message indicates that the UE needs to perform the normal RRC connection establishment procedure rather than the procedures of the small data transmission solutions. In such a condition, the eNB may further initiate RRC procedures such as security mode command procedure and RRC connection reconfiguration procedure to setup a data radio bearer for small data transmission. In an embodiment, the RRC connection request message corresponding to the second RRC connection may also include a small data indicator, in order to indicate that this RRC connection is established for small data transmission. It is noted in UMTS, a radio bearer setup procedure is used instead of the RRC connection reconfiguration procedure.

Figure 5:
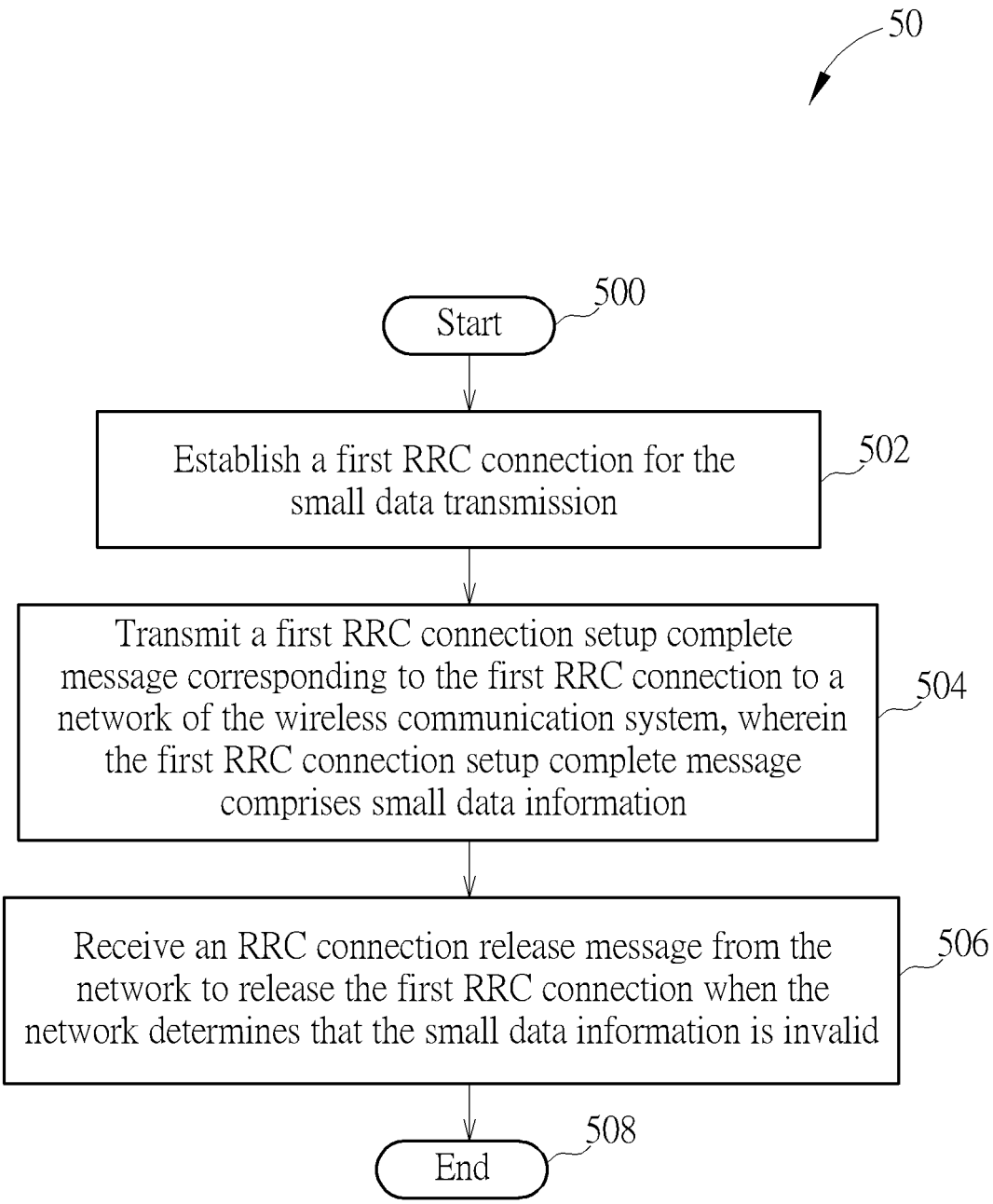
FIG. 5 is a flowchart of a process according to an embodiment of the present invention.

Please refer to FIG. 5, which is a flowchart of a process 50 according to an embodiment of the present invention. The process 50 may be utilized in a UE of the wireless communication system 10 shown in FIG. 1, for handling a small data transmission. The process 50 may be compiled into the program code 214 and includes the following steps:

Step 500: Start.

Step 502: Establish a first RRC connection for the small data transmission.

Step 504: Transmit a first RRC connection setup complete message corresponding to the first RRC connection to a network of the wireless communication system, wherein the first RRC connection setup complete message comprises small data information.

Step 506: Receive an RRC connection release message from the network to release the first RRC connection when the network determines that the small data information is invalid.

Step 508: End.

According to the process 50, the UE first establishes the first RRC connection for the small data transmission by transmitting the RRC connection request message to the eNB, and transmits the first RRC connection setup complete message corresponding to the first RRC connection to the network after reception of the RRC connection setup message, wherein the first RRC connection setup complete message comprises small data information. When the eNB transmits the RRC connection release message because it determines that the small data information is invalid, the UE may correspondingly receive the RRC connection release message to release the first RRC connection.

As mentioned above, the small data information may include at least one of a connection ID and a token. The RRC connection release message may also include a cause indicating that the small data information is invalid, e.g. the connection ID is invalid or the token is invalid. When the UE receives the cause in the RRC connection release message, the UE invalidates the small data information. After the first RRC connection is released due to the RRC connection release message, the UE may further establish a second RRC connection for the small data transmission. The UE then transmits a second RRC connection setup complete message corresponding to the second RRC connection to the network, wherein the second RRC connection setup complete message includes a service request message. The service request message indicates that the UE needs to perform the normal RRC connection establishment procedure rather than the procedures of the small data transmission solutions. In such a condition, the UE may further perform RRC procedures such as security mode command procedure and RRC connection reconfiguration procedure initiated by the eNB to setup a data radio bearer for small data transmission. In an embodiment, the RRC connection request message corresponding to the second RRC connection may also include a small data indicator, in order to indicate that the required RRC connection is established for small data transmission. It is noted in UMTS, a radio bearer setup procedure is used instead of the RRC connection reconfiguration procedure.

Please note that the UE may need to transmit small data to the network and thus establish an RRC connection with an eNB according to the control plane solution disclosed in Solution 2a of the 3GPP. Please refer to FIG. 6, which illustrates a table of message transmission between the UE and the eNB for the RRC connection according to Solution 2a. As shown in FIG. 6, the UL indicates the transmissions from the UE to the eNB, and the DL indicates the transmissions from the eNB to the UE. The UE first transmits an RRC connection request message to the eNB, where the RRC connection request message may include a small data indicator indicating that the required RRC connection is utilized for transmitting small data. The eNB then transmits an RRC connection setup message to set up the RRC connection. The UE then transmits an RRC connection setup complete message to the eNB, in order to indicate that the RRC connection setup is complete. According to Solution 2a of the 3GPP, the RRC connection setup complete message may include a key set identifier (KSI), an evolved packet system (EPS) bearer identity and an Internet protocol (IP) packet (e.g. non-access stratum (NAS) data packet or user datagram protocol/Internet protocol (UDP/IP) packet). The IP packet may be regarded as the small data required to be transmitted by the UE. In other words, the small data is transmitted together with the RRC connection setup complete message. After reception of the RRC connection setup complete message and the small data, the eNB forwards the small data to the core network. The core network then transmits a DL NAS transport message including a release command and a response of the IP packet to the eNB. The eNB accordingly transmits an RRC connection release message to the UE to release the RRC connection and forwards the response of the IP packet together with the RRC connection release message.

In several conditions, the eNB may not support Solution 2a of the 3GPP. When an eNB without Solution 2a capability receives the RRC connection setup complete message including the KSI, EPS bearer identity and IP packet, the eNB may also forward the message to the core network. The core network then transmits the DL NAS transport message including the release command and the response of the IP packet to the eNB. However, the eNB cannot process this message since the eNB does not support Solution 2a. Instead, the eNB may expect to receive an initial context setup request message from the core network as in the normal RRC connection establishment procedure. In such a condition, the eNB may get stuck due to reception of the unexpected DL NAS transport message.

Figure 7:
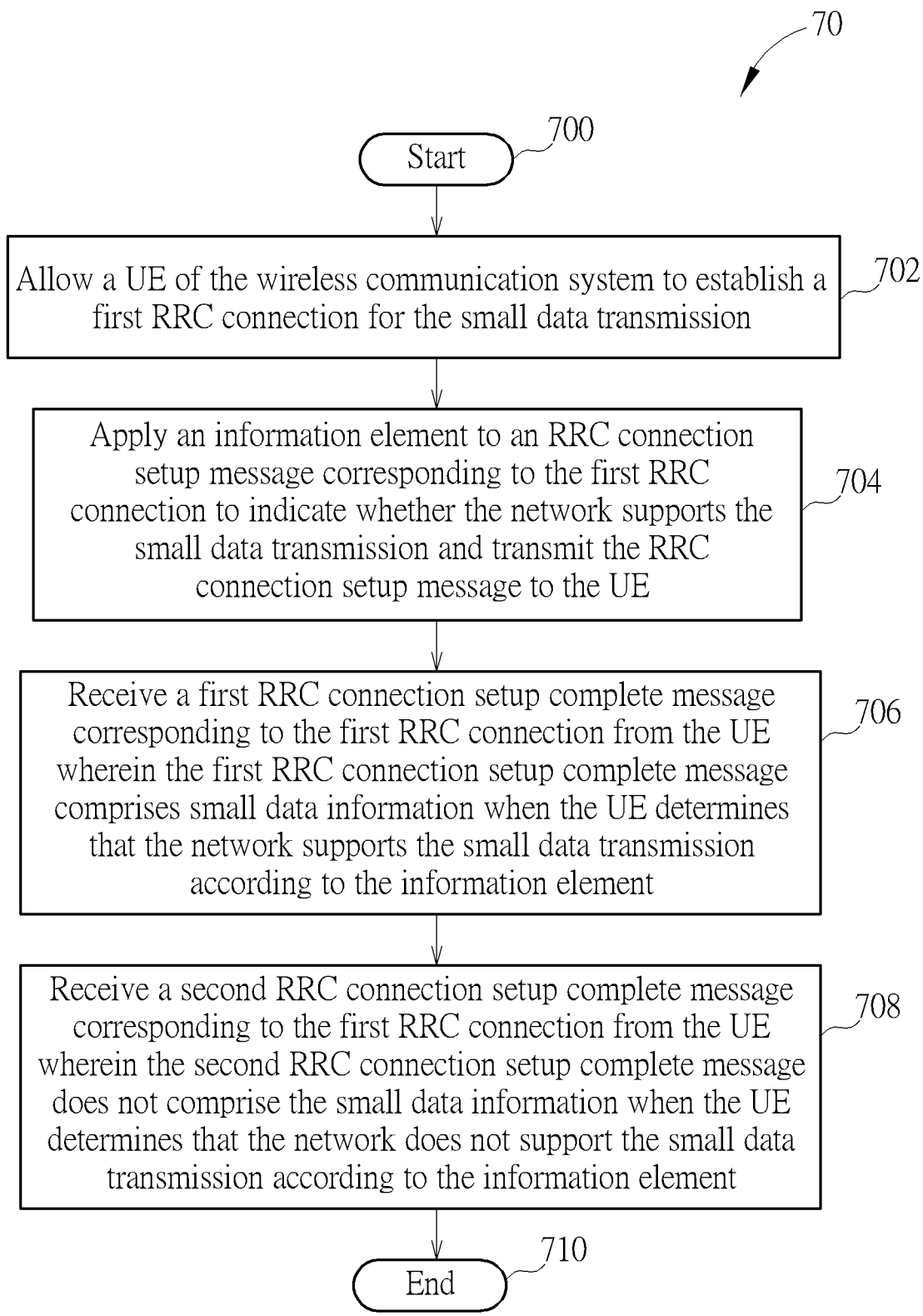
FIG. 7 is a flowchart of a process according to an embodiment of the present invention.

Please refer to FIG. 7, which is a flowchart of a process 70 according to an embodiment of the present invention. The process 70 may be utilized in an eNB of the network of the wireless communication system 10 shown in FIG. 1, for handling a small data transmission. The process 70 may be compiled into the program code 214 and includes the following steps:

Step 700: Start.

Step 702: Allow a UE of the wireless communication system to establish a first RRC connection for the small data transmission.

Step 704: Apply an information element to an RRC connection setup message corresponding to the first RRC connection to indicate whether the network supports the small data transmission and transmit the RRC connection setup message to the UE.

Step 706: Receive a first RRC connection setup complete message corresponding to the first RRC connection from the UE wherein the first RRC connection setup complete message comprises small data information when the UE determines that the network supports the small data transmission according to the information element.

Step 708: Receive a second RRC connection setup complete message corresponding to the first RRC connection from the UE wherein the second RRC connection setup complete message does not comprise the small data information when the UE determines that the network does not support the small data transmission according to the information element.

Step 710: End.

According to the process 70, the eNB first allows the UE to establish the first RRC connection for the small data transmission, and applies an information element (IE) to the RRC connection setup message corresponding to the first RRC connection to indicate whether the network (e.g. the eNB) supports the small data transmission. The eNB then transmits the RRC connection setup message to the UE. For example, the eNB may include the IE in the RRC connection setup message if the eNB supports the small data transmission, and does not include the IE from the RRC connection setup message if the eNB does not support the small data transmission. In an embodiment, the IE may be utilized for indicating or commanding the UE to perform the small data transmission. In another embodiment, the IE may also include a configuration for the small data transmission.

If the UE determines that the network supports the small data transmission according to the IE, the eNB may receive the first RRC connection setup complete message corresponding to the first RRC connection from the UE, wherein the first RRC connection setup complete message may comprise the small data information. If the UE determines that the network does not support the small data transmission according to the IE, the eNB may receive the second RRC connection setup complete message corresponding to the first RRC connection from the UE, wherein the second RRC connection setup complete message may not comprise the small data information.

If the eNB supports Solution 2a, the RRC connection establishment procedure for the small data transmission may go on, so that the small data information may be included in the RRC connection setup complete message as disclosed in Solution 2a, where the small data information may include at least one of the KSI, the EPS bearer identity and the IP packet. If the eNB does not support Solution 2a, the RRC connection establishment procedure may follow the normal procedure for transmitting normal user data; that is, the RRC connection setup complete message received by the eNB may not include the small data information. Instead, the RRC connection setup complete message may include a service request message. The service request message indicates that the UE needs to perform the normal RRC connection establishment procedure rather than the procedures of the small data transmission solutions. In such a condition, the eNB may further initiate RRC procedures such as security mode command procedure and RRC connection reconfiguration procedure to setup a data radio bearer for small data transmission. It is noted in UMTS, a radio bearer setup procedure is used instead of the RRC connection reconfiguration procedure.

Please note that the IE mentioned in the process 70 for determining whether the eNB supports Solution 2a may also be applied for determining whether the eNB supports Solution 3a or Solution 3b. In an embodiment, the eNB may apply the IE to the RRC connection setup message to indicate whether the network supports Solution 3a, and thus the small data information contained in the first RRC connection setup complete message may include at least one of a serving gateway (SGW) bearer resource identity and an IP packet. In another embodiment, the eNB may apply the IE to the RRC connection setup message to indicate whether the network supports Solution 3b, and thus the small data information contained in the first RRC connection setup complete message may include at least one of a signature, a token and a connection ID.

Figure 8:
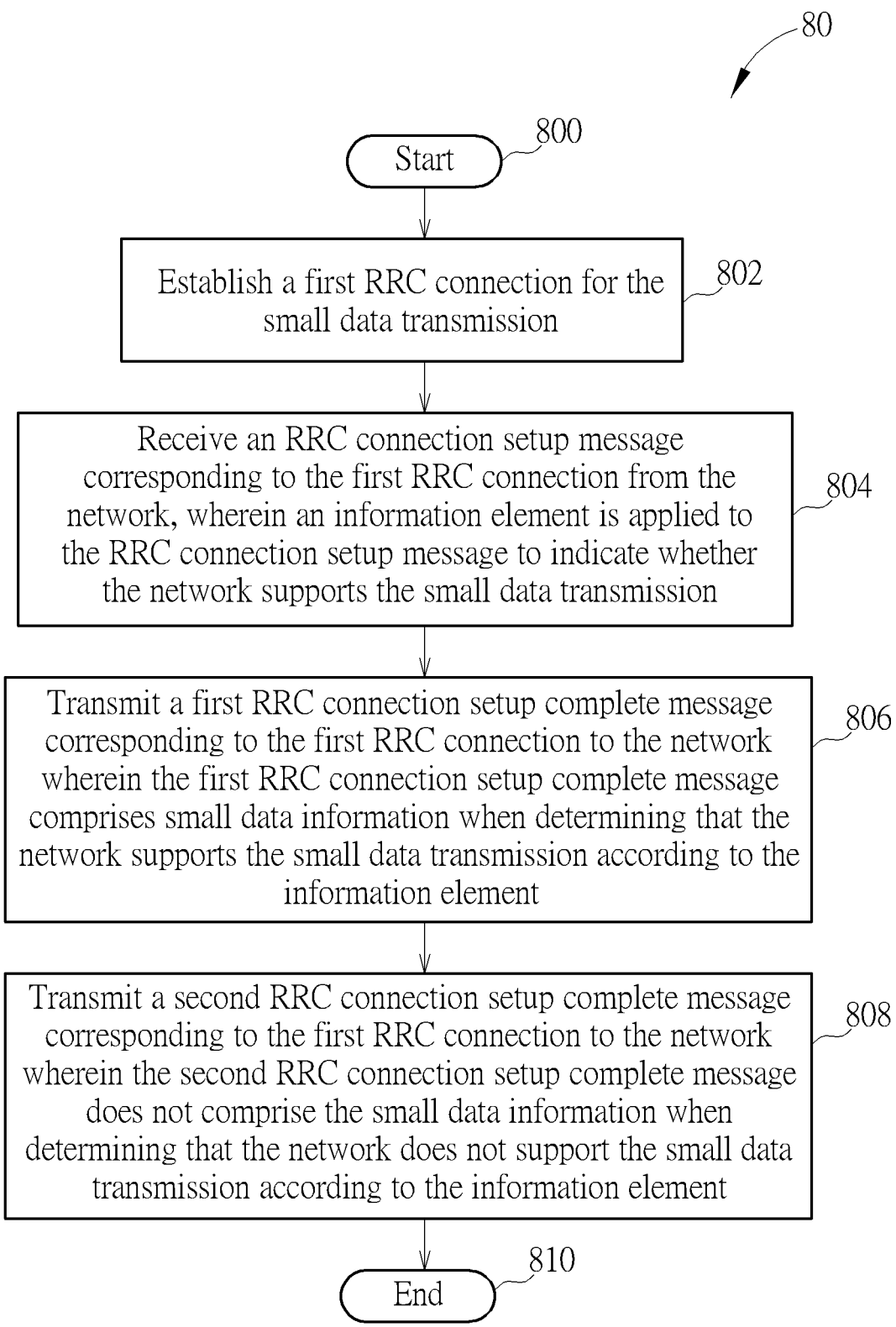
FIG. 8 is a flowchart of a process according to an embodiment of the present invention.

Please refer to FIG. 8, which is a flowchart of a process 80 according to an embodiment of the present invention. The process 80 may be utilized in a UE of the wireless communication system 10 shown in FIG. 1, for handling a small data transmission. The process 80 may be compiled into the program code 214 and includes the following steps:

Step 800: Start.

Step 802: Establish a first RRC connection for the small data transmission.

Step 804: Receive an RRC connection setup message corresponding to the first RRC connection from the network, wherein an information element is applied to the RRC connection setup message to indicate whether the network supports the small data transmission.

Step 806: Transmit a first RRC connection setup complete message corresponding to the first RRC connection to the network wherein the first RRC connection setup complete message comprises small data information when determining that the network supports the small data transmission according to the information element.

Step 808: Transmit a second RRC connection setup complete message corresponding to the first RRC connection to the network wherein the second RRC connection setup complete message does not comprise the small data information when determining that the network does not support the small data transmission according to the information element.

Step 810: End.

According to the process 80, the UE first establishes a first RRC connection for the small data transmission, and receives an RRC connection setup message corresponding to the first RRC connection from the eNB, where an IE is applied to the RRC connection setup message to indicate whether the network (e.g. the eNB) supports the small data transmission. For example, the UE may determine that the eNB does not support the small data transmission if the IE is not included in the RRC connection setup message, and determine that the eNB supports the small data transmission if the IE is included in the RRC connection setup message. As mentioned above, the UE may be commanded by the IE to perform the small data transmission. The IE may also include a configuration for the small data transmission.

If the UE determines that the network supports the small data transmission according to the IE, the UE may transmit the first RRC connection setup complete message corresponding to the first RRC connection to the eNB, wherein the first RRC connection setup complete message may comprise the small data information. If the UE determines that the network does not support the small data transmission according to the IE, the UE may transmit the second RRC connection setup complete message corresponding to the first RRC connection to the eNB, wherein the second RRC connection setup complete message may not comprise the small data information.

If the UE determines that the eNB supports Solution 2a, the RRC connection establishment procedure for the small data transmission may go on, so that the UE may follow Solution 2a to include the small data information in the RRC connection setup complete message, where the small data information may include at least one of the KSI, the EPS bearer identity and the IP packet. If the UE determines that the eNB does not support Solution 2a, the RRC connection establishment procedure may follow the normal procedure for transmitting normal user data; that is, the RRC connection setup complete message transmitted by the UE may not include the small data information. Instead, the RRC connection setup complete message may include a service request message. The service request message indicates that the UE needs to perform the normal RRC connection establishment procedure rather than the procedures of the small data transmission solutions. In such a condition, the UE may further perform RRC procedures such as security mode command procedure and RRC connection reconfiguration procedure initiated by the eNB to setup a data radio bearer for small data transmission. It is noted in UMTS, a radio bearer setup procedure is used instead of the RRC connection reconfiguration procedure.

Please note that the IE mentioned in the process 80 for determining whether the eNB supports Solution 2a may also be applied for determining whether the eNB supports Solution 3a or Solution 3b. Detailed operations of the IE applied for determination of Solution 3a or Solution 3b are described above, and will not be narrated herein.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling small data transmission for a wireless communication system. The method allows the eNB to release an RRC connection by transmitting an RRC connection release message when the small data information included in the RRC connection setup complete message is invalid. In addition, the method further allows the eNB to apply an IE indicating whether the network supports the small data transmission to the RRC connection setup message, so that the UE can determine whether the network supports the small data transmission according to the IE when receiving the RRC connection setup message. Therefore, the UE may include the small data information in the RRC connection setup complete message when determining that the network supports the small data transmission, in order to perform the RRC connection establishment procedure according to the small data transmission solutions. The UE may also include the service request message in the RRC connection setup complete message when determining that the network does not support the small data transmission, in order to perform the normal RRC connection establishment procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a small data transmission for a network of a wireless communication system, the method comprising:
    allowing a user equipment of the wireless communication system to establish a first radio resource control (RRC) connection for the small data transmission;
    receiving a first RRC connection setup complete message corresponding to the first RRC connection from the user equipment, wherein the first RRC connection setup complete message comprises small data information; and
    transmitting an RRC connection release message to the user equipment to release the first RRC connection when determining that the small data information is invalid.

2. The method of claim 1, wherein the small data information comprises at least one of a connection identifier and a token.

3. The method of claim 1, wherein the RRC connection release message comprises a cause indicating that the small data information is invalid.

4. The method of claim 1, further comprising:
    allowing the user equipment to establish a second RRC connection for the small data transmission when the first RRC connection is released due to the RRC connection release message; and
    receiving a second RRC connection setup complete message corresponding to the second RRC connection, wherein the second RRC connection setup complete message comprises a service request message.

5. The method of claim 4, wherein an RRC connection request message corresponding to the second RRC connection comprises a small data indicator.

6. A method of handling a small data transmission for a user equipment of a wireless communication system, the method comprising:
    establishing a first radio resource control (RRC) connection for the small data transmission;
    transmitting a first RRC connection setup complete message corresponding to the first RRC connection to a network of the wireless communication system, wherein the first RRC connection setup complete message comprises small data information; and
    receiving an RRC connection release message from the network to release the first RRC connection when the network determines that the small data information is invalid.

7. The method of claim 1, wherein the small data information comprises at least one of a connection identifier and a token.

8. The method of claim 1, wherein the RRC connection release message comprises a cause indicating that the small data information is invalid.

9. The method of claim 1, further comprising:
    establishing a second RRC connection for the small data transmission when the first RRC connection is released due to the RRC connection release message; and
    transmitting a second RRC connection setup complete message corresponding to the second RRC connection to the network, wherein the second RRC connection setup complete message comprises a service request message.

10. The method of claim 9, wherein an RRC connection request message corresponding to the second RRC connection comprises a small data indicator.

11. A method of handling a small data transmission for a network of a wireless communication system, the method comprising:
    allowing a user equipment of the wireless communication system to establish a first radio resource control (RRC) connection for the small data transmission;
    applying an information element to an RRC connection setup message corresponding to the first RRC connection to indicate whether the network supports the small data transmission and transmitting the RRC connection setup message to the user equipment;
    receiving a first RRC connection setup complete message corresponding to the first RRC connection from the user equipment wherein the first RRC connection setup complete message comprises small data information when the user equipment determines that the network supports the small data transmission according to the information element; and
    receiving a second RRC connection setup complete message corresponding to the first RRC connection from the user equipment wherein the second RRC connection setup complete message does not comprise the small data information when the user equipment determines that the network does not support the small data transmission according to the information element.

12. The method of claim 11, wherein the small data information comprises at least one of a key set identifier, an evolved packet system bearer identity, an Internet protocol packet, a serving gateway bearer resource identity, a signature, a token and a connection identifier.

13. The method of claim 11, wherein the second RRC connection setup complete message comprises a service request message.

14. A method of handling a small data transmission for a user equipment of a wireless communication system, the method comprising:
    establishing a first radio resource control (RRC) connection for the small data transmission;
    receiving an RRC connection setup message corresponding to the first RRC connection from a network of the wireless communication system, wherein an information element is applied to the RRC connection setup message to indicate whether the network supports the small data transmission;

transmitting a first RRC connection setup complete message corresponding to the first RRC connection to the network wherein the first RRC connection setup complete message comprises small data information when determining that the network supports the small data transmission according to the information element; and transmitting a second RRC connection setup complete message corresponding to the first RRC connection to the network wherein the second RRC connection setup complete message does not comprise the small data information when determining that the network does not support the small data transmission according to the information element.

15. The method of claim 14, wherein the small data information comprises at least one of a key set identifier, an evolved packet system bearer identity and an Internet protocol packet, a serving gateway bearer resource identity, a signature, a token and a connection identifier.

16. The method of claim 14, wherein the second RRC connection setup complete message comprises a service request message.

17. The method of claim 14, further comprising:
determining that the network does not support the small data transmission when the received RRC connection setup message does not comprise the information element.

* * * * *